Figure 1:
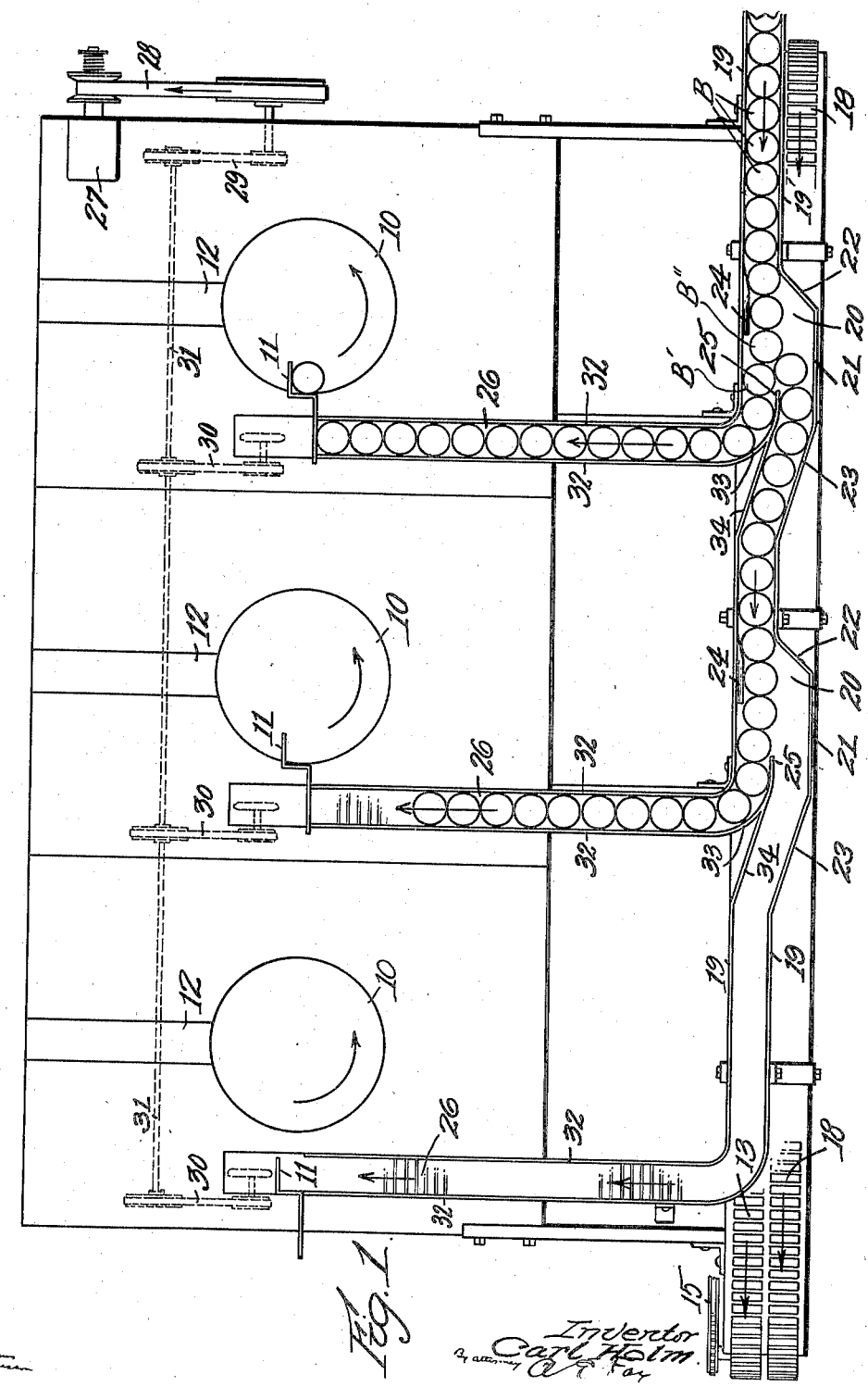

Sept. 24, 1940.	C. HOLM	2,215,702
CONVEYING SYSTEM
Filed Feb. 8, 1939	2 Sheets-Sheet 1

Inventor
Carl Holm

Sept. 24, 1940.    C. HOLM    2,215,702
CONVEYING SYSTEM
Filed Feb. 8, 1939    2 Sheets-Sheet 2
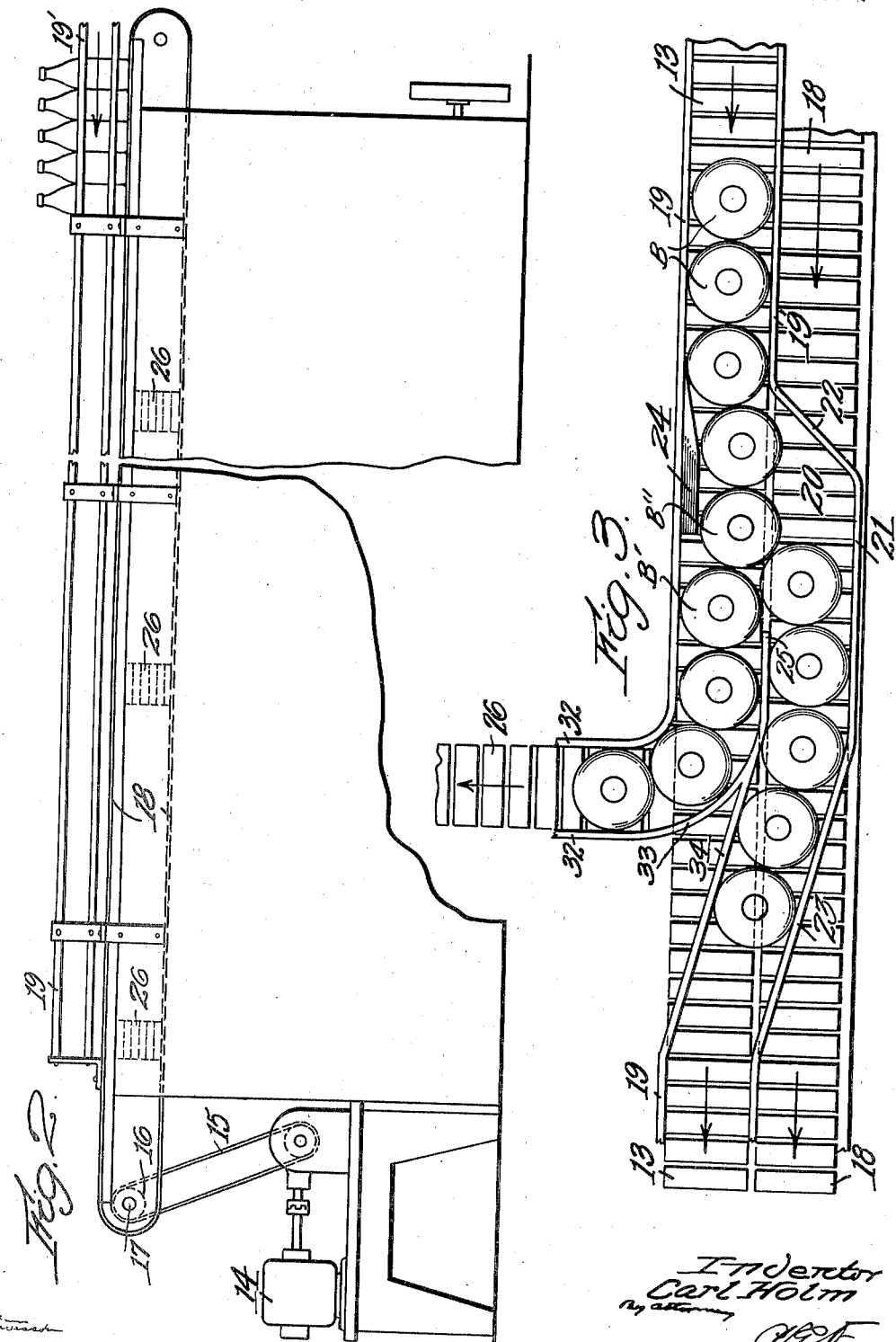

Patented Sept. 24, 1940

2,215,702

UNITED STATES PATENT OFFICE 2,215,702

CONVEYING SYSTEM

Carl Holm, Worcester, Mass., assignor to Economic Machinery Company, Worcester, Mass., a corporation of Massachusetts Application February 8, 1939, Serial No. 255,288

5 Claims. (Cl. 198—81)

This invention relates to a system of conveyors, especially designed for conveying bottles from a single source to a plurality of bottle labeling machines but capable of use for conveying bottles to capping, or other machines, or for conveying cans or other receptacles circular in cross section, to machines for filling them or performing other operations upon them.

In prior devices of this character, as for example, the Augensen Patent No. 1,236,391, the mechanism provides for distributing cans or other circular articles from a single source to a plurality of machines for performing an operation thereon. The mechanism by which this distribution of the cans is obtained involves a plurality of movable elements, and unless the movable elements function satisfactorily the cans are not uniformly distributed in the desired manner.

One of the principal features of the invention is a provision for distributing articles which are circular in cross section between a plurality of machines, the structure being arranged so that the required number of machines may operate at capacity with any surplus of articles being directed to the next machine in line. This distribution of articles is accomplished without the necessity for any movable elements for alternately directing the articles into one path or another.

The principal objects of the invention are to provide a main conveyor with simple and inexpensive means for shifting the bottles or the like laterally thereon so as to get the bottles at that point out of alignment with the main line of bottles and thus provide means whereby, if the stream of bottles beyond becomes blocked or full, the next bottle to said means will act on the bottle that is pushed aside to force it off the conveyor; to provide a second conveyor parallel to the first and working at the same speed in proximity thereto to receive such a bottle; to provide means whereby the bottles pushed aside will be moved along and returned to the first conveyor; to provide a series of transverse conveyors for receiving the bottles from the first or longitudinal conveyor and delivering the bottles to a corresponding series of machines acting upon them, and to provide means whereby, in the ordinary working of the device, the bottles will be carried by the first longitudinal conveyor and diverted into the first transverse conveyor until that is full and whereby, by continuous operation, the next bottle will be forced aside from the first conveyor and then back on the first conveyor and then onto the second transverse conveyor. This operation may be repeated over again as many times as there are machines for performing such operations as capping, labeling, or filling, on bottles, cans or other circular receptacles.

Other and further objects and advantages of the invention will more fully appear from the following detailed description taken in connection with the accompanying drawings in which Fig. 1 is a plan view of a composite machine for labeling bottles, comprising three units to which the bottles from a single source are fed in accordance with the principles of this invention;

Fig. 2 is a side view showing the means for operating the longitudinal conveying belts, and Fig. 3 is a plan similar to Fig. 1, on enlarged scale, showing the act of shifting the bottles from one conveyor to another.

This invention is shown as applied to a machine involving, in the form shown, three units 10 represented by circles indicating rotary tables. Each of these units is adapted for labeling, filling, capping, or performing other operations on the bottles or other circular articles as they are delivered thereto. These units 10 each are adapted to have the bottle or other articles fed radially onto the rotary table and the operation on the article is then performed as the table rotates. Pushers 11 are shown, one for each table, for moving the bottles or cans radially onto the rotary machine. The point of discharge 12 from each machine is merely indicated. But it is not essential to this invention that this type of labeling machine be employed, since the invention resides in a distribution of the cans and bottles to the several units 10.

In order to feed the machines with bottles, cans, receptacles, and the like, preferably circular in cross section, an endless belt conveyor 13 is employed running parallel to and extending the entire length of the row of units 10. This conveyor may be operated by a motor 14 through a belt 15 and pulley 16 on the shaft 17, which also has a pulley for the belt conveyor 13.

Also mounted on the same shaft 17 is a separate pulley or the same pulley for operating a second belt conveyor 18 parallel to and closely adjacent to the conveyor 13. These two conveyors have their upper surfaces in the same plane and in certain instances may be a single wide conveyor belt. They are located closely adjacent to each other throughout their length and they run at the same speed and in the same direction. The bottles, cans, receptacles, etc. are fed in any ordinary way onto the conveyor 13 at the extreme right, Fig. 1. This conveyor moves in the direction of the arrows toward the left and carries the articles between two guiding walls 19 and 19', the latter being in line with the division between the conveyors 13 and 18. These walls define the path of movement of the articles and previous lateral shifting of the bottles on the conveyor.

The bottles or other articles B are delivered to the several units 10 by transverse conveyors 26, one for each unit. All of the conveyors 26 may be operated from a single motor 27 connected through suitable pulleys and belts 28 and 29 to a longitudinal shaft 31. A plurality of belts 30 provide a driving connection from the shaft 31 to the several conveyors 26. These conveyors pick up the bottles or other articles from the longitudinal conveyor 13 and advance the bottles into a position for engagement with the pusher 11 with each unit. The bottles are then discharged onto the rotary table as rapidly as the machine unit can perform the desired operation on the bottle. At certain points adjacent the end of each conveyor 26, the wall 19' is offset to form a space 20 overlying the conveyor 18. A wall 21 extending along the outside edge of the conveyor 18 and slanting walls 22 and 23 overlying the conveyor 18 and integral with the walls 19' and 21 define the edge of the space 20 and guide the bottles or other articles, as will hereinafter appear. At a point adjacent to this opening or space 20 is a stationary cam 24 on the wall 19, this cam having a slanting vertical wall for engaging the sides of the bottles or other articles and obviously moving them slightly out of the normal line of movement of the articles on the conveyor 13 and shifting the articles toward the conveyor 18. Ordinarily the bottles are moved by this cam 24 slightly to one side of the conveyor 13 and then, when they get beyond the cam 24 they are gradually moved back into the normal line of movement by a projecting barrier 25 in line with the wall 19'.

Each of the conveyors 26 is provided with side walls 32, one of which is curved and joins the wall 19, and the other of which extends across the conveyor 13 as at 33 and is in line with the barrier 25, the latter, as above stated, being in line with the wall 19'. This barrier 25 is at the side of the conveyor 13 opposite the machine 10 and, in conjunction with the curved wall 33, serves to guide the bottles from the conveyor 13 onto the side conveyor 26 until that conveyor is filled, as shown. When the conveyor 26 for the machine unit 10 nearest to the source of supply is filled with bottles, as shown in Fig. 1, all the bottles are stopped for a moment, back to and including the bottle B' which has been restored to the normal line of movement of the bottles on the conveyor 13. The following bottle B" which is on the conveyor 13 and has been pushed to one side, is not in alignment with the bottle B' and comes into contact with it at a point off its center, as shown. Continued advance of the succeeding bottles by the conveyor 13 tends to push the bottle B' further out of line with the other bottles and onto conveyor 18, as indicated. The bottles are then advanced by the conveyor 18 until they engage the wall 23 by which the bottle or bottles are directed back onto the conveyor 13. A wall 34 parallel to the wall 23 aids in guiding the bottles back onto the conveyor 13, this wall 34 being in alinement with the side wall 19 and barrier 25, as shown. The bottles, which are thus directed around the first barrier 25 are manipulated in the same way as they approach the second cam 24 and barrier 25 and are thus fed onto the second side conveyor 26 until their movement onto this conveyor is blocked for one reason or another. In this event the same lateral shifting of the bottles onto the second conveyor takes place for directing the overflow of bottles to a third or subsequent transverse conveyor.

By this process it will be seen that the bottles are fed continuously on the conveyor 13, that they are automatically handled, merely by a fixed cam 24 and barrier 25 first to supply the nearest machine unit 10 with bottles. Since the conveyor 13 is normally geared up to move a little faster than the conveyor 26 and to deliver bottles faster than they can be handled by a single machine unit 10, the conveyor 13 will fill the entire conveyor 26 with bottles, as shown. As above stated, when the bottles can no longer be fed onto the first conveyor 26, the leading offset bottle B" is directed onto the conveyor 18 around the barrier 25 and is then delivered to the second or succeeding machine unit 10. It will be understood that if any one of the machine units does not function the movement of the bottles to the machine is discontinued and the bottles are automatically by-passed around the side conveyor which normally directs bottles to that particular machine unit.

It will be seen that the use of this stationary cam 24 in conjunction with the second conveyor 18 constitutes a simple and effective device for moving some receptacles sideways on the conveyor 13 and off that conveyor onto the conveyor 18 at a definite point, whenever there is an obstruction or a completion of the filling of one of the lateral conveyors 26. This delivery of bottles or other articles from a single source to a plurality of machine units 10 thus is effective without the necessity for any movable elements other than the conveyor structure by which the bottles are advanced in a substantially horizontal path.

Although the foregoing description indicates that the barrier 25 restores the articles on the conveyor to the same lateral position that they maintained before shifted by the cam 24, it will be understood that this is not an essential feature. The cam 24 shifts the articles out of their original alinement and establishes a second alinement of the articles. The barrier 25 offsets the articles again from the second alinement, the barrier 25 being so positioned that the articles engaging with the barrier will normally all pass to one side thereof. If the passage of articles to this side is prevented, as for example, by the conveyor 26 being entirely filled, as shown, the articles in the second alinement resulting from the action of the cam 24 being out of line with the remaining articles, will be directed to the opposite side of the barrier 25 and are thus by-passed to be directed to the second, or any successive lateral conveyor 26. The function of the barrier 25 is thus normally to direct all of the articles out of the second alinement and to one side of this barrier; obviously, the conveyor or conveyors beneath the barrier 25 must be of sufficient width to provide for an advance of the bottles or other articles on either side of the barrier.

I claim:

1. In a conveyor system, the combination with a conveyor adapted for the advance of articles in alinement thereon, of means for shifting the articles out of alinement at a predetermined point, a fixed barrier above the conveyor and spaced longitudinally of the conveyor from said fixed means for engagement with the offset articles for again offsetting said articles, said barrier being positioned to provide for movement of the articles to either side of the barrier on the conveyor whereby if the articles cannot move to one side of the barrier they will automatically be directed to the opposite side thereof.

2. In a conveyor system, the combination with a conveyor for the advance of articles, of spaced walls above the conveyor for maintaining articles thereon in alinement, fixed means for shifting the articles out of alinement at a predetermined point, one of the walls at this point being offset to provide for the shifting of the articles, a fixed barrier above the conveyor and spaced longitudinally of the conveyor from the first means, said barrier being in a position to again offset the articles and normally to direct the articles to one side thereof.

3. In a conveyor system, the combination with a conveyor for the advance of articles, of spaced walls above the conveyor for maintaining articles thereon in alinement, fixed means for shifting the articles out of alinement at a predetermined point, one of the walls at this point being offset to provide for the shifting of the articles, a fixed barrier above the conveyor and spaced longitudinally of the conveyor from the first means, said barrier being in a position to again offset the articles and normally to direct the articles to one side thereof, said walls adjacent the barrier being spaced to provide for movement of the articles past the barrier on either side thereof, whereby if normal movement of the articles past the barrier is interferred with, the articles as they are originally offset will be automatically diverted to the opposite side of the barrier.

4. In a conveyor system, the combination with a main conveyor and a plurality of side conveyors between which the articles on the main conveyor are distributed, of means for guiding the articles on the main conveyor in alinement with each other, means for offsetting the articles at a predetermined point, a fixed barrier spaced longitudinally of the conveyor surface from said offsetting means for again offsetting the articles, a guiding wall associated with said barrier for directing the articles offset by said barrier onto one of the side conveyors, said barrier being so positioned above the surface of the main conveyor that the articles may pass said barrier on either side thereof, although normally all the articles are directed to a single side thereof.

5. In a conveyor system, the combination with a main conveyor and a plurality of side conveyors between which the articles on the main conveyor are distributed, of means for guiding the articles on the main conveyor in alinement with each other, means for offsetting the articles at a predetermined point, a fixed barrier spaced longitudinally of the conveyor surface from said offsetting means for again offsetting the articles, a guiding wall associated with said barrier for directing the articles offset by said barrier onto one of the side conveyors, said barrier being so positioned above the surface of the main conveyor that the articles may pass said barrier on either side thereof, although normally all the articles are directed to a single side thereof, said guiding means being spaced apart adjacent the barrier to guide articles for movement with the conveyor on each side of the barrier.

CARL HOLM.